US011825154B2

(12) United States Patent
Okada et al.

(10) Patent No.: US 11,825,154 B2
(45) Date of Patent: Nov. 21, 2023

(54) RECEIVER AND CONTROL METHOD FOR RECEIVER

(71) Applicant: SONY SEMICONDUCTOR SOLUTIONS CORPORATION, Kanagawa (JP)

(72) Inventors: Satoshi Okada, Kanagawa (JP); Kenichi Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 224 days.

(21) Appl. No.: 17/309,660

(22) PCT Filed: Sep. 3, 2019

(86) PCT No.: PCT/JP2019/034591
§ 371 (c)(1),
(2) Date: Jun. 14, 2021

(87) PCT Pub. No.: WO2020/129325
PCT Pub. Date: Jun. 25, 2020

(65) Prior Publication Data
US 2022/0078508 A1 Mar. 10, 2022

(30) Foreign Application Priority Data
Dec. 21, 2018 (JP) .................. 2018-238988

(51) Int. Cl.
*H04N 21/438* (2011.01)
*H04L 1/00* (2006.01)

(52) U.S. Cl.
CPC ......... *H04N 21/438* (2013.01); *H04L 1/0045* (2013.01); *H04L 1/0061* (2013.01)

(58) Field of Classification Search
CPC .......... H04N 21/2362; H04N 21/4345; H04N 21/438; H04N 21/4382; H04N 21/6112; H04N 21/615
See application file for complete search history.

(56) References Cited

U.S. PATENT DOCUMENTS

2006/0262744 A1   11/2006   Xu et al.
2007/0277077 A1   11/2007   Vesma et al.
(Continued)

FOREIGN PATENT DOCUMENTS

CA   2580396 A1   3/2006
CA   2979252 A1   9/2016
(Continued)

OTHER PUBLICATIONS

International Search Report and Written Opinion of PCT Application No. PCT/JP2019/034591, dated Oct. 8, 2019, 10 pages of ISRWO.
(Continued)

*Primary Examiner* — Rong Le
(74) *Attorney, Agent, or Firm* — CHIP LAW GROUP

(57) ABSTRACT

In a receiver that receives signals of the ATSC 3.0 standard, a terrestrial digital broadcasting signal is extracted from the received signals. A reception unit performs reception processing of sequentially receiving a predetermined number of reception target frames, each of which is a transmission unit of the terrestrial digital broadcasting signal. A reception interval acquisition unit obtains, as a reception interval, an interval between respective reception start timings of the predetermined number of reception target frames. A frame length acquisition unit acquires a frame length of each of the reception target frames on the basis of the reception target frames. A reception control unit stops the reception process-
(Continued)

ing for a period of a length of a difference between the reception interval and the frame length.

9 Claims, 16 Drawing Sheets

(56) References Cited

U.S. PATENT DOCUMENTS

| | | | |
|---|---|---|---|
| 2016/0286488 A1 | 9/2016 | Simon et al. | |
| 2018/0213270 A1 | 7/2018 | Ng | |

FOREIGN PATENT DOCUMENTS

| | | | |
|---|---|---|---|
| CA | 2992400 | A1 | 2/2017 |
| CN | 1893328 | A | 1/2007 |
| CN | 101040469 | A | 9/2007 |
| CN | 107431546 | A | 12/2017 |
| CN | 108028952 | A | 5/2018 |
| EP | 1717974 | A2 | 11/2006 |
| EP | 1790097 | A4 | 5/2007 |
| JP | 2006-345493 | A | 12/2006 |
| JP | 2008-514084 | A | 5/2008 |
| JP | 2018-514973 | A | 6/2018 |
| KR | 10-2006-0112159 | A | 10/2006 |
| KR | 10-2007-0061869 | A | 6/2007 |
| KR | 10-2017-0130497 | A | 11/2017 |
| KR | 10-2018-0018750 | A | 2/2018 |
| MX | 2018001112 | A | 3/2018 |
| TW | 200635259 | A | 10/2006 |
| TW | 201640853 | A | 11/2016 |
| WO | 2006/030329 | A1 | 3/2006 |
| WO | 2016/154386 | A1 | 9/2016 |
| WO | 2017/029794 | A1 | 2/2017 |

OTHER PUBLICATIONS

"ATSC Standard: Physical Layer Protocol", Document A/322, Advanced Television Systems Committee, Sep. 7, 2016, 258 pages.

| Signaling Fields for Bootstrap Symbol 2 | |
|---|---|
| Syntax | No. of Bits |
| bootstrap_symbol_2() {<br>    ea_wake_up_2<br>    bsr_coefficient  ~501<br>} | <br>1<br>7 |

| Approximate Elementary Periods T | | | |
|---|---|---|---|
| bsr_coefficient | 2 | 5 | 8 |
| Elementary period $T$ (μs) | 0.1447 | 0.1240 | 0.1085 |

FIG. 9

| L1-Basic Signaling Fields and Syntax | |
|---|---|
| Syntax | No. of Bits |
| L1_Basic_signaling() { | |
|     L1B_version | 3 |
|     L1B_mimo_scattered_pilot_encoding | 1 |
|     L1B_lls_flag | 1 |
|     L1B_time_info_flag | 2 |
|     L1B_return_channel_flag | 1 |
|     L1B_papr_reduction | 2 |
|     L1B_frame_length_mode | 1 |
|     if ( L1B_frame_length_mode=0 ) { | |
|         L1B_frame_length | 10 |
|         L1B_excess_samples_per_symbol | 13 |
|     } else { | |
|         L1B_time_offset | 16 |
|         L1B_additional_samples | 7 |
|     } | |
|     L1B_num_subframes    *511* | 8 |
|     L1B_preamble_num_symbols    *512* | 3 |
|     L1B_preamble_reduced_carriers | 3 |
|     L1B_L1_Detail_content_tag | 2 |
|     L1B_L1_Detail_size_bytes | 13 |
|     L1B_L1_Detail_fec_type | 2 |
|     L1B_L1_Detail_additional_parity_mode | 19 |
|     L1B_L1_Detail_total_cells | 2 |
|     L1B_first_sub_mimo | 1 |
|     L1B_first_sub_miso | 2 |
|     L1B_first_sub_fft_size    *513* | 2 |
|     L1B_first_sub_reduced_carriers    *514* | 3 |
|     L1B_first_sub_guard_interval | 4 |
|     L1B_first_sub_num_ofdm_symbols    *515* | 11 |
|     L1B_first_sub_scattered_pilot_pattern | 5 |
|     L1B_first_sub_scattered_pilot_boost | 3 |
|     L1B_first_sub_sbs_first | 1 |
|     L1B_first_sub_sbs_last | 1 |
|     L1B_reserved | 48 |
|     L1B_crc | 32 |
| } | |

FIG. 10

| L1-Detail Signaling Fields and Syntax | |
|---|---|
| Syntax | No. of Bits |
| L1_Detail_signaling() { | |
|     L1D_version | 4 |
|     L1D_num_rf | 3 |
|     for (L1D_rf_id=1 .. L1D_num_rf) { | |
|         L1D_bonded_bsid | 19 |
|         reserved | |
|     } | |
|     if (L1B_time_info_flag != 00) { | |
|         L1D_time_sec | 32 |
|         L1D_time_msec | 10 |
|         if (L1B_time_info_flag != 01) { | |
|             L1D_time_usec | 10 |
|             if (L1B_time_info_flag != 10) { | |
|                 L1D_time_nsec | 10 |
|             } | |
|         } | |
|     } | |
|     for (i=0 .. L1B_num_subframes) { | |
|         if (i > 0) { | |
|             L1D_mimo | 1 |
|             L1D_miso | 2 |
|             L1D_fft_size   ~521 | 2 |
|             L1D_reduced_carriers | 3 |
|             L1D_guard_interval   ~522 | 4 |
|             L1D_num_ofdm_symbols   ~523 | 11 |
|             L1D_scattered_pilot_pattern | 5 |
|             L1D_scattered_pilot_boost | 3 |
|             L1D_sbs_first | 1 |
|             L1D_sbs_last | 1 |
|         } | |

| Signaling Format for L1D_fft_size and L1B_first_sub_fft_size ||
|---|---|
| Value | FFT Size |
| 00 | 8K |
| 01 | 16K |
| 10 | 32K |
| 11 | Reserved |

FIG. 11A

| Signaling format for L1D_guard_interval and L1B_first_sub_guard_interval ||||
|---|---|---|---|
| Value | Guard Interval | Value | Guard Interval |
| 0000 | Reserved | 0111 | GI8_2432 |
| 0001 | GI1_192 | 1001 | GI9_3072 |
| 0010 | GI2_384 | 1010 | GI10_3648 |
| 0011 | GI3_512 | 1011 | GI11_4096 |
| 0100 | GI4_768 | 1100 | GI12_4864 |
| 0101 | GI5_1024 | 1101 | Reserved |
| 0110 | GI6_1536 | 1110 | Reserved |

| VERSION | FRAME LENGTH |
|---------|--------------|
| 3.0     | LEN1         |
| 3.1     | LEN2         |
| 3.2     | LEN3         |

RECEIVER AND CONTROL METHOD FOR RECEIVER

CROSS REFERENCE TO RELATED APPLICATIONS

This application is a U.S. National Phase of International Patent Application No. PCT/JP2019/034591 filed on Sep. 3, 2019, which claims priority benefit of Japanese Patent Application No. JP 2018-238988 filed in the Japan Patent Office on Dec. 21, 2018. Each of the above-referenced applications is hereby incorporated herein by reference in its entirety.

TECHNICAL FIELD

The present technology relates to a receiver and a control method for the receiver. More specifically, the present technology relates to a receiver that receives terrestrial digital broadcasting and a control method for the receiver.

BACKGROUND ART

In recent years, development and research of receivers that receive next-generation terrestrial digital broadcasting using Advanced Television Systems Committee standards (ATSC) standards have been promoted. A bootstrap is inserted at the head of a frame of the ATSC standards, and information regarding a version of the ATSC standards is stored in the bootstrap (see, for example, Non-Patent Document 1). For example, a frame whose version is "3.0" is used for the terrestrial digital broadcasting. In the ATSC 3.0 standard, it is planned to insert signals other than the ATSC 3.0 standard, such as signals for mobile communication, into a terrestrial digital broadcasting signal of the ATSC 3.0 standard in the future.

CITATION LIST

Non-Patent Document

Non-Patent Document 1: ATSC Standard: Physical Layer Protocol Doc. A/321: 2016", Advanced Television Systems Committee, Internet (https://www.atsc.org/standards/atsc-3-0-standards/)

SUMMARY OF THE INVENTION

Problems to be Solved by the Invention

A receiver of the ATSC 3.0 standard described above can receive and decode a frame of the standard and reproduce video and audio of the terrestrial digital broadcasting. However, at present, the ATSC 3.0 standard does not specify where in the frame information regarding reception periods of other signals is described. For this reason, it is difficult for the receiver of the ATSC 3.0 standard to extract and receive only the terrestrial digital broadcasting signal of the ATSC 3.0 standard in a case where the terrestrial digital broadcasting signal of the ATSC 3.0 standard and other signals are mixed.

The present technology has been created in view of such a situation, and an object thereof is, in a receiver that receives signals of the ATSC 3.0 standard, to extract a terrestrial digital broadcasting signal from the received signals.

Solutions to Problems

The present technology has been made to solve the above-described problem, and a first aspect thereof is a receiver and a control method for the receiver, the receiver including a reception unit that performs reception processing of sequentially receiving a predetermined number of reception target frames, each of which is a transmission unit of a terrestrial digital broadcasting signal, a reception interval acquisition unit that obtains, as a reception interval, an interval between respective reception start timings of the predetermined number of reception target frames, a frame length acquisition unit that acquires a frame length of each of the reception target frames on the basis of the reception target frames, and a reception control unit that stops the reception processing for a period of a length of a difference between the reception interval and the frame length. With this configuration, the effect of stopping the reception processing on signals other than the terrestrial digital broadcasting signal is obtained.

Furthermore, in the first aspect, a clocking unit that performs processing of clocking elapsed time that has elapsed from a reception end timing of a bootstrap in the reception target frame and processing of initializing the elapsed time every time the reception end timing is detected may further be included, and the reception interval acquisition unit may acquire a maximum value of the elapsed time as the reception interval. With this configuration, the effect of acquiring, as the reception interval, an interval between reception end timings of bootstraps is obtained.

Furthermore, in the first aspect, a demodulation processing unit that performs demodulation processing of demodulating the reception target frame to generate a demodulated signal and processing of detecting the reception end timing of the bootstrap may further be included. With this configuration, the effect of demodulating the reception target frame is obtained.

Furthermore, in the first aspect, an error correction processing unit that performs error correction processing of correcting an error of the demodulated signal may further be included. With this configuration, the effect of correcting an error in the demodulated signal is obtained.

Furthermore, in the first aspect, the reception control unit may further stop the demodulation processing and the error correction processing for the period of the length of the difference. With this configuration, the effect of further stopping the demodulation processing and the error correction processing is obtained.

Furthermore, in the first aspect, a subtractor that acquires the difference and supplies the difference to the reception control unit every time the reception interval and the frame length are acquired may further be included, and the reception control unit may stop the reception processing for the period of the length of the difference in a case where the number of times of acquiring the difference is larger than a predetermined threshold value. With this configuration, the effect of stopping the reception processing on signals other than the terrestrial digital broadcasting signal in the case where the number of times of acquiring the difference is larger than the threshold value is obtained.

Furthermore, in the first aspect, the terrestrial digital broadcasting signal may be a signal conforming to the ATSC standards. With this configuration, the effect of stopping the reception processing on signals other than the terrestrial digital broadcasting signal in the ATSC standards is obtained.

Furthermore, in the first aspect, the frame length acquisition unit may acquire, from the reception target frame, information indicating each of "bsr_coefficient", the number of subframes, an FFT size, the number of symbols, and a guard interval length, and calculate the frame length by using the information. With this configuration, the effect of calculating the frame length from the information in the reception target frame is obtained.

BRIEF DESCRIPTION OF DRAWINGS

FIG. 9 is a diagram illustrating an example of the syntax of layer(L)1-Basic information in the embodiment of the present technology.

FIG. 10 is a diagram illustrating an example of the syntax of L1-Detail information in the embodiment of the present technology.

FIGS. 11A and 11B are diagrams illustrating an example of a fast Fourier transform (FFT) size and a guard interval length in the embodiment of the present technology.

FIG. 17 is a diagram illustrating an example of a calculated value of a frame length for each version in a second modification of the embodiment of the present technology.

MODE FOR CARRYING OUT THE INVENTION

Hereinafter, a mode for carrying out the present technology (hereinafter, referred to as embodiment) will be described. The description will be made in the following order.

1. Embodiment (Example of Stopping Reception Processing within Period of Difference between Reception Target Frame Length and Reception Interval)
2. First Modification
3. Second Modification 1. Embodiment

[Configuration Example of Receiver]

Figure 1:
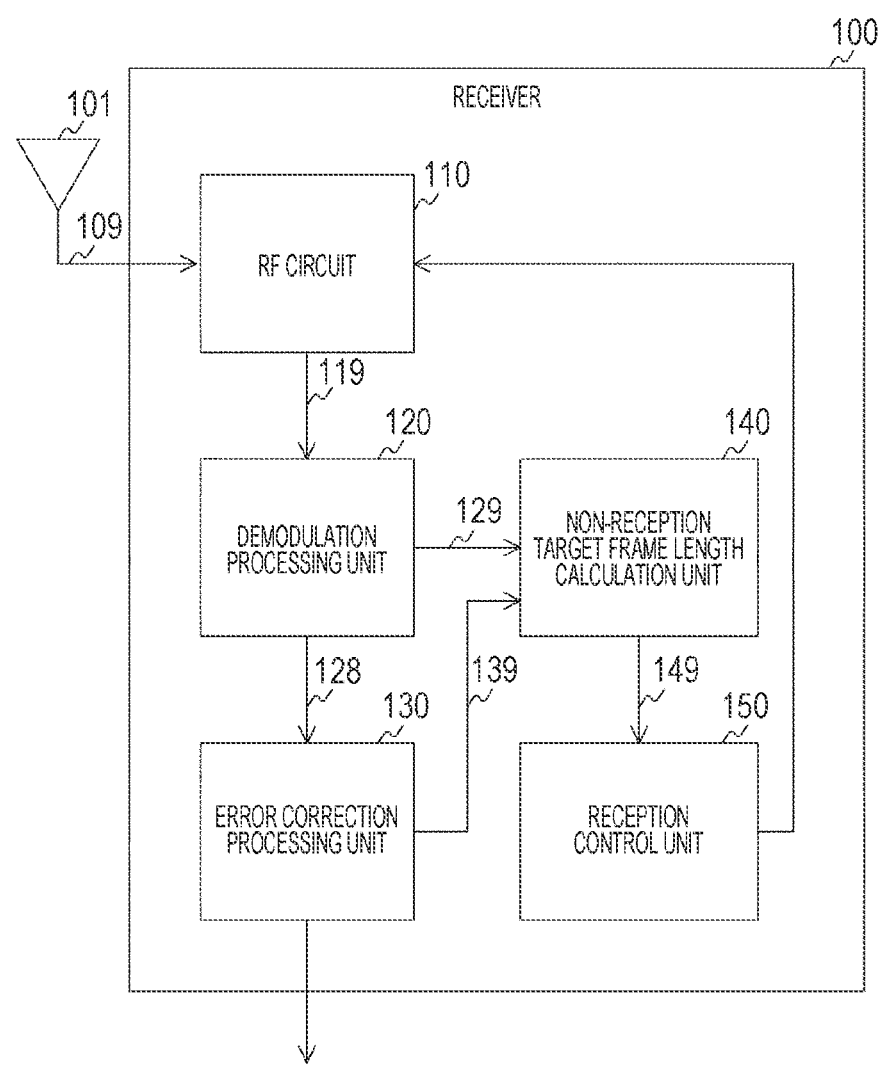
FIG. 1 is a block diagram illustrating a configuration example of a receiver in an embodiment of the present technology.

FIG. 1 is a block diagram illustrating a configuration example of a receiver 100 in an embodiment of the present technology. The receiver 100 receives a terrestrial digital broadcasting signal. The receiver 100 includes an antenna 101, an RF circuit 110, a demodulation processing unit 120, an error correction processing unit 130, a non-reception target frame length calculation unit 140, and a reception control unit 150.

The antenna 101 converts electromagnetic waves from a broadcasting station into electric signals and supplies the electric signals to the RF circuit 110 via a signal line 109. The RF circuit 110 performs reception processing of receiving, as an RF signal, a signal in a predetermined frequency band among the electric signals from the antenna 101. The RF signal is a signal conforming to the ATSC standards.

Here, the version 3.0 among versions of the ATSC standards is a next-generation standard for the terrestrial digital broadcasting signal. The receiver 100 receives the terrestrial digital broadcasting signal of the ATSC 3.0 standard. In addition, a wireless signal of the ATSC standards includes a predetermined number of transmission units called frames. Hereinafter, a frame of the ATSC 3.0 standard will be referred to as a "reception target frame".

Meanwhile, ATSC 3.1, ATSC 4.0, and the like are assumed as versions other than the ATSC 3.0, and, for example, using signals of these standards in mobile communication is being considered. It is planned to insert signals other than the ATSC 3.0 into the terrestrial digital broadcasting signal of the ATSC 3.0 standard in a time-division manner in the future. The receiver 100 that supports the ATSC 3.0 standard does not need to receive frames other than this standard, and does not receive the frames. Therefore, a frame of a standard other than the ATSC 3.0 will be hereinafter referred to as a "non-reception target frame".

The RF signal received by the RF circuit 110 is supposed to include the above-described predetermined number of reception target frames and non-reception target frames inserted between the reception target frames in a time division manner. The RF circuit 110 supplies the RF signal to the demodulation processing unit 120 via a signal line 119. Note that the RF circuit 110 is an example of a reception unit described in the claims.

The demodulation processing unit 120 demodulates the RF signal and performs demodulation processing of generating a demodulated signal. Furthermore, the demodulation processing unit 120 detects a reception end timing of a bootstrap in a reception target frame, and generates a flag indicating the timing as a detection flag. The demodulation processing unit 120 then supplies the demodulated signal to the error correction processing unit 130 via a signal line 128, and supplies the bootstrap and the detection flag to the non-reception target frame length calculation unit 140 via a signal line 129.

The error correction processing unit 130 performs error correction processing of correcting an error on the demodulated signal from the demodulation processing unit 120. The error correction processing unit 130 supplies the signal after the error correction to a display device and an audio reproduction device. These display device and audio reproduction device reproduce video and audio of terrestrial digital broadcasting. Furthermore, the error correction processing unit 130 acquires L1 information from a preamble in the reception target frame and supplies the L1 information to the non-reception target frame length calculation unit 140 via a signal line 139.

The non-reception target frame length calculation unit 140 calculates a frame length of the non-reception target frame on the basis of the detection flag and the bootstrap from the demodulation processing unit 120 and the L1 information from the error correction processing unit 130. The details of a calculation method will be described later. The non-reception target frame length calculation unit 140 supplies the calculated frame length to the reception control unit 150 via a signal line 149.

The reception control unit 150 controls a reception operation of the RF circuit 110 on the basis of a calculated value of the non-reception target frame length calculation unit 140. The details of a control method will be described later.

[Configuration Example of RF Circuit]

Figure 2:
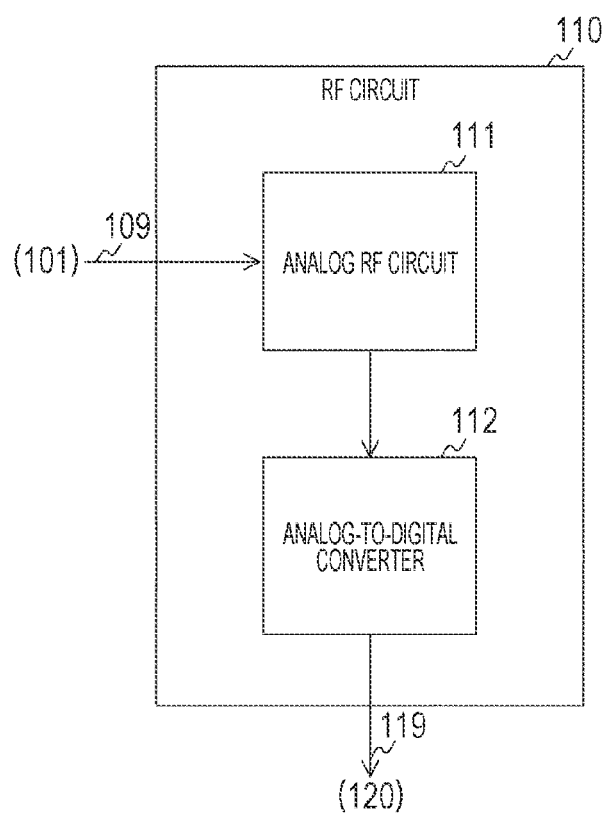
FIG. 2 is a block diagram illustrating a configuration example of a radio frequency (RF) circuit in the embodiment of the present technology.

FIG. 2 is a block diagram illustrating a configuration example of the RF circuit 110 in the embodiment of the present technology. The RF circuit 110 includes an analog RF circuit 111 and an analog-to-digital converter 112.

The analog RF circuit 111 converts an electric signal from the antenna 101 into an analog RF signal. The analog RF circuit 111 supplies the RF signal to the analog-to-digital converter 112.

The analog-to-digital converter 112 performs analog-to-digital (AD) conversion on the analog RF signal. The analog-to-digital converter 112 supplies the RF signal after the AD conversion (that is, a digital signal) to the demodulation processing unit 120.

[Configuration Example of Demodulation Processing Unit]

Figure 3:
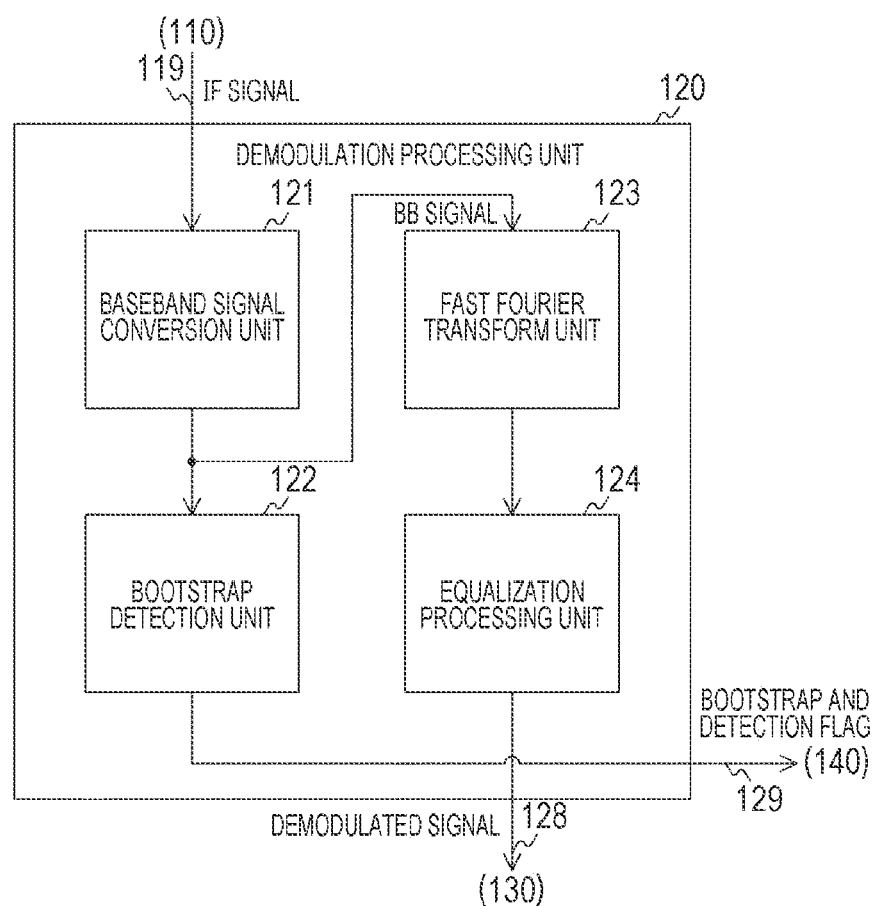
FIG. 3 is a block diagram illustrating a configuration example of a demodulation processing unit in the embodiment of the present technology.

FIG. 3 is a block diagram illustrating a configuration example of the demodulation processing unit 120 in the embodiment of the present technology. The demodulation processing unit 120 includes a baseband signal conversion unit 121, a bootstrap detection unit 122, a fast Fourier transform unit 123, and an equalization processing unit 124.

The baseband signal conversion unit 121 converts the RF signal into a baseband signal. The baseband signal conversion unit 121 converts, for example, the frequency of the RF signal into an intermediate frequency, and converts the signal of the intermediate frequency into the baseband signal. The baseband signal conversion unit 121 supplies the baseband signal as a BB signal to the bootstrap detection unit 122 and the fast Fourier transform unit 123.

The bootstrap detection unit 122 analyzes the BB signal and detects the reception end timing of the bootstrap of the reception target frame. As described above, the frame of the ATSC 3.0 standard corresponds to the reception target frame. In the ATSC standards, information regarding the version is stored in the bootstrap in the frame. Therefore, the bootstrap detection unit 122 can determine whether the bootstrap is of the reception target frame or the non-reception target frame by analyzing the bootstrap in the BB signal. In a case where the bootstrap is of the reception target frame, the bootstrap detection unit 122 generates the detection flag at the reception end timing of the bootstrap and supplies the detection flag together with the bootstrap to the non-reception target frame length calculation unit 140.

On the other hand, in a case where the bootstrap is of the non-reception target frame, the bootstrap detection unit 122 does not generate the detection flag for the bootstrap.

The fast Fourier transform unit 123 performs a fast Fourier transform (FFT) on the BB signal. The fast Fourier transform unit 123 supplies the signal after the transform to the equalization processing unit 124.

The equalization processing unit 124 performs equalization processing of compensating the phase and amplitude of the signal after the FFT. The equalization processing unit 124 supplies the signal after the equalization processing as the demodulated signal to the error correction processing unit 130.

[Configuration Example of Error Correction Processing Unit]

Figure 4:
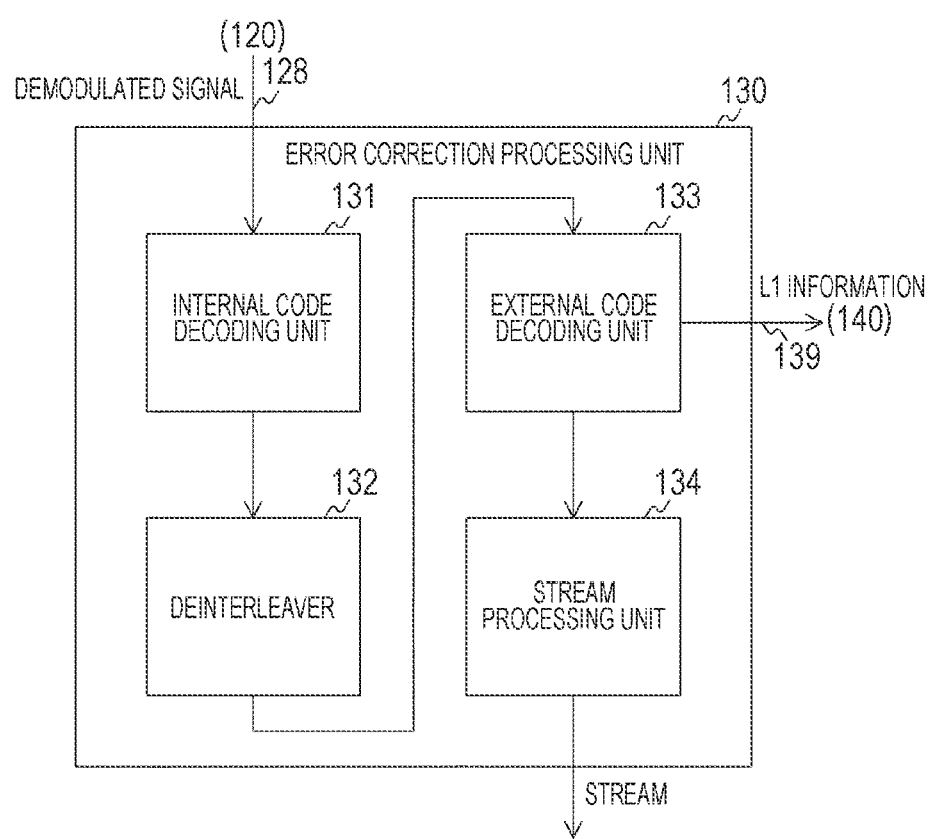
FIG. 4 is a block diagram illustrating a configuration example of an error correction processing unit in the embodiment of the present technology.

FIG. 4 is a block diagram illustrating a configuration example of the error correction processing unit 130 in the embodiment of the present technology. The error correction processing unit 130 includes an internal code decoding unit 131, a deinterleaver 132, an external code decoding unit 133, and a stream processing unit 134.

The internal code decoding unit 131 decodes an internal code in the demodulated signal from the demodulation processing unit 120. The internal code decoding unit 131 supplies the signal after the decoding to the deinterleaver 132.

The deinterleaver 132 performs deinterleave processing on the signal after decoding the internal code. The deinterleaver 132 supplies the signal after the deinterleave processing to the external code decoding unit 133.

The external code decoding unit 133 decodes an external code of the signal after the deinterleave processing. The external code decoding unit 133 supplies the signal after the decoding to the stream processing unit 134. Furthermore, the external code decoding unit 133 extracts the L1 information of the reception target frame from the signal after the decoding and supplies the L1 information to the non-reception target frame length calculation unit 140.

The stream processing unit 134 decodes the signal after decoding the external code, for example, and generates a stream including transport stream (TS) packets. The stream processing unit 134 supplies the generated stream to the display device and the like.

[Non-Reception Target Frame Length Calculation Unit]

Figure 5:
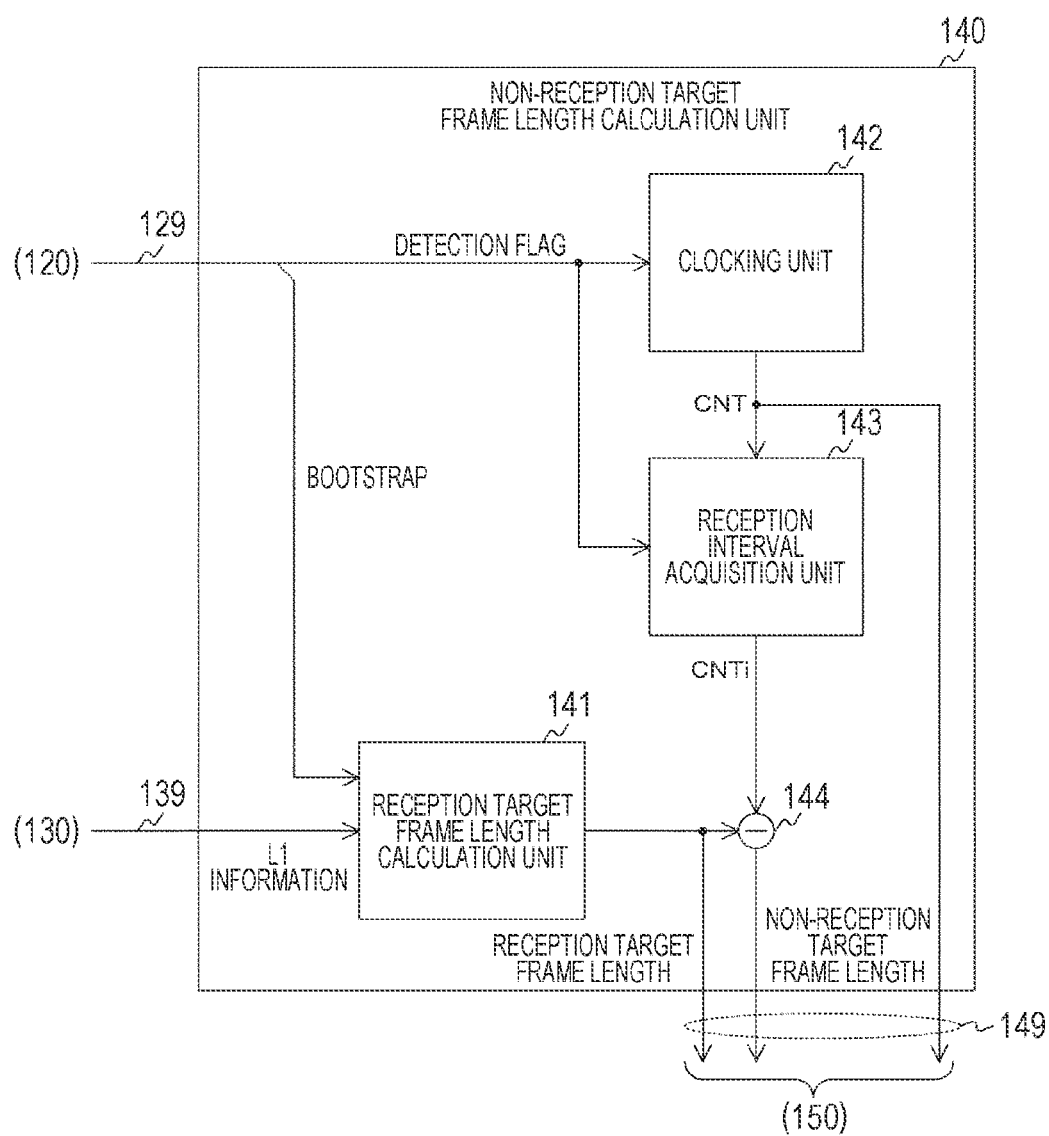
FIG. 5 is a block diagram illustrating a configuration example of a non-reception target frame length calculation unit in the embodiment of the present technology.

FIG. 5 is a block diagram illustrating a configuration example of the non-reception target frame length calculation unit 140 in the embodiment of the present technology. The non-reception target frame length calculation unit 140 includes a reception target frame length calculation unit 141, a clocking unit 142, a reception interval acquisition unit 143, and a subtractor 144.

The reception target frame length calculation unit 141 calculates a frame length of the reception target frame on the basis of the bootstrap and the L1 information from the demodulation processing unit 120 and the error correction processing unit 130. The details of the calculation method will be described later. The reception target frame length calculation unit 141 supplies a calculated value as a reception target frame length to the subtractor 144 and the reception control unit 150. Note that the reception target frame length calculation unit 141 is an example of a frame length acquisition unit described in the claims.

The clocking unit 142 clocks elapsed time that has elapsed from a timing indicated by the detection flag from the demodulation processing unit 120 (that is, the reception end timing of the bootstrap). Furthermore, the clocking unit 142 initializes the elapsed time to an initial value (0 seconds or the like) every time the detection flag is supplied. For example, a counter that counts in synchronization with a clock signal is used as the clocking unit 142. The clocking unit 142 supplies a clocked elapsed time CNT to the reception interval acquisition unit 143 and the reception control unit 150.

The reception interval acquisition unit 143 acquires, as a reception interval, an interval between respective reception start timings of two adjacent reception target frames. The reception interval acquisition unit 143 acquires the elapsed time CNT immediately before the timing indicated by the detection flag (in other words, the maximum value of the elapsed time CNT) as a reception interval CNTi and supplies the reception interval CNTi to the subtractor 144.

The subtractor 144 obtains a difference between the reception target frame length calculated by the reception target frame length calculation unit 141 and the reception interval CNTi acquired by the reception interval acquisition unit 143. The subtractor 144 supplies, to the reception control unit 150, the difference as a non-reception target frame length, which is the frame length of the non-reception target frame.

Figure 6:
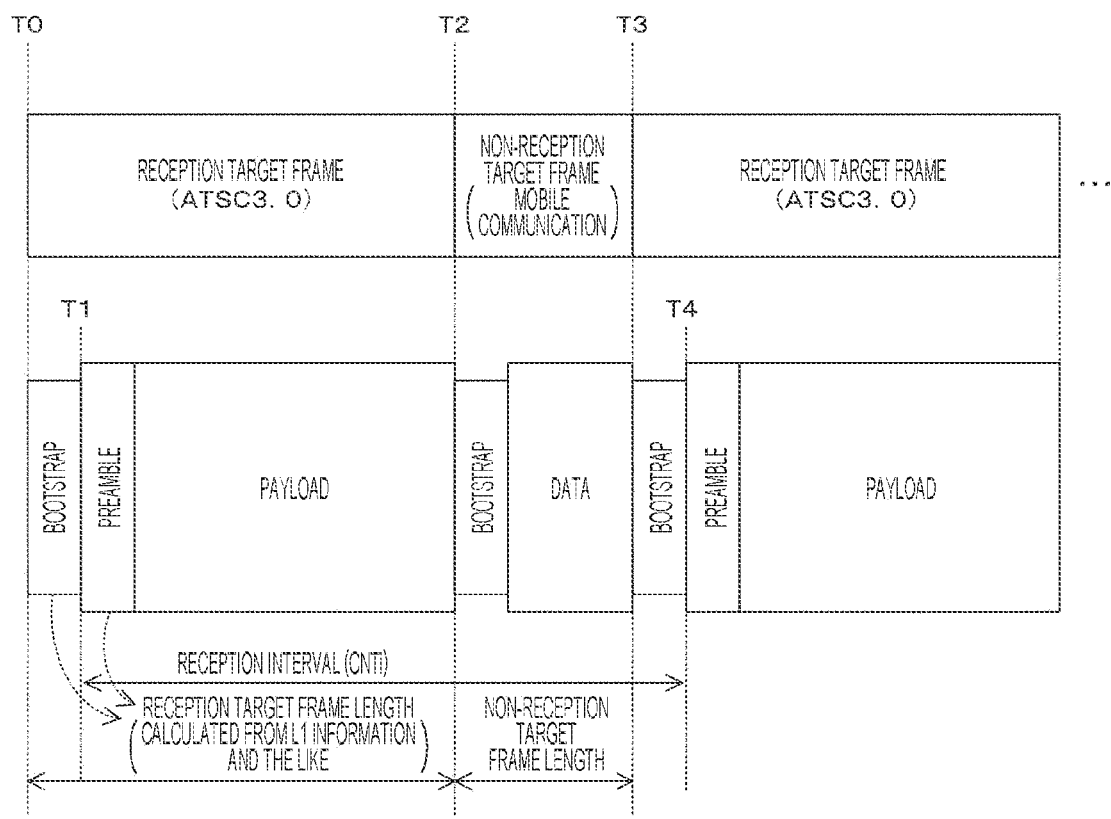
FIG. 6 is a diagram for describing a calculation method for a non-reception target frame length in the embodiment of the present technology.

FIG. 6 is a diagram for describing the calculation method for the non-reception target frame length in the embodiment of the present technology. The RF signal includes the predetermined number of reception target frames and the non-reception target frames inserted between the reception target frames. The non-reception target frames are inserted periodically. For example, every time N (N is an integer) reception target frames are transmitted in succession, one non-reception target frame is transmitted immediately after these frames. FIG. 6 illustrates respective data structures of an N-th reception target frame, a non-reception target frame transmitted next, and a reception target frame transmitted subsequently.

Each of the reception target frames includes the bootstrap, the preamble, and a payload in order from the head. The version information of the ATSC standards is stored in the bootstrap as described above. The L1 information is stored in the preamble as described above.

On the other hand, the non-reception target frame includes a bootstrap and various data. In the ATSC standards, a bootstrap format of the non-reception target frame is the same as that of the reception target frame, but the versions are different. Furthermore, respective bootstrap lengths of the reception target frame and the non-reception target frame are fixed lengths.

The reception start timing of the N-th reception target frame is T0, the reception end timing of the bootstrap of the N-th reception target frame is T1, and the reception end timing of the N-th reception target frame is T2. Furthermore, the reception start timing of the reception target frame next to the non-reception target frame is T3, and the reception end timing of the bootstrap of the reception target frame is T4.

In the ATSC standards, the bootstrap and the L1 information in the preamble store information necessary for calculating the frame length of the reception target frame. Therefore, the reception target frame length calculation unit 141 can calculate the reception target frame length by using the information. In FIG. 6, time from the timing T0 to the timing T2 corresponds to the reception target frame length.

Furthermore, in the ATSC 3.0 standard, time division multiplexing of a frame other than the ATSC 3.0 (non-reception target frame) is planned, but where to store information necessary for calculating a frame length of the frame is not described in specifications of the ATSC 3.0 standard. Therefore, the receiver 100 conforming to the ATSC 3.0 standard cannot calculate the frame length of the non-reception target frame from the information in the non-reception target frame.

Therefore, the clocking unit 142 in the receiver 100 clocks the elapsed time from the reception end timing T1 of the bootstrap. The reception interval acquisition unit 143 then acquires, as the reception interval CNTi, the elapsed time from the timing T1 to the reception end timing T4 of the next bootstrap. This reception interval CNTi is an interval between the respective bootstraps of the two adjacent reception target frames. As described above, since the bootstrap length is fixed, the reception interval CNTi is equal to an interval between the reception start timing T0 of the reception target frame and the reception start timing T3 of the next reception target frame.

In a case where the non-reception target frame is not inserted, the reception interval CNTi substantially matches the reception target frame length. Here, "substantially matching" means that values match exactly or that the difference is equal to or less than a predetermined allowable value. On the other hand, in a case where the non-reception target frame is inserted, the reception interval CNTi is longer than the reception target frame length, and the difference therebetween substantially matches the non-reception target frame length. Therefore, the non-reception target frame length calculation unit 140 can obtain the non-reception target frame length by calculating the difference. The receiver 100 conforming to the ATSC 3.0 standard does not need to receive the non-reception target frame other than the ATSC 3.0 standard. Therefore, the receiver 100 can take out only the reception target frame and appropriately receive the terrestrial digital broadcasting by stopping the reception processing for a period of the difference (that is, the non-reception target frame length).

Figures 7, 8A, 8B:
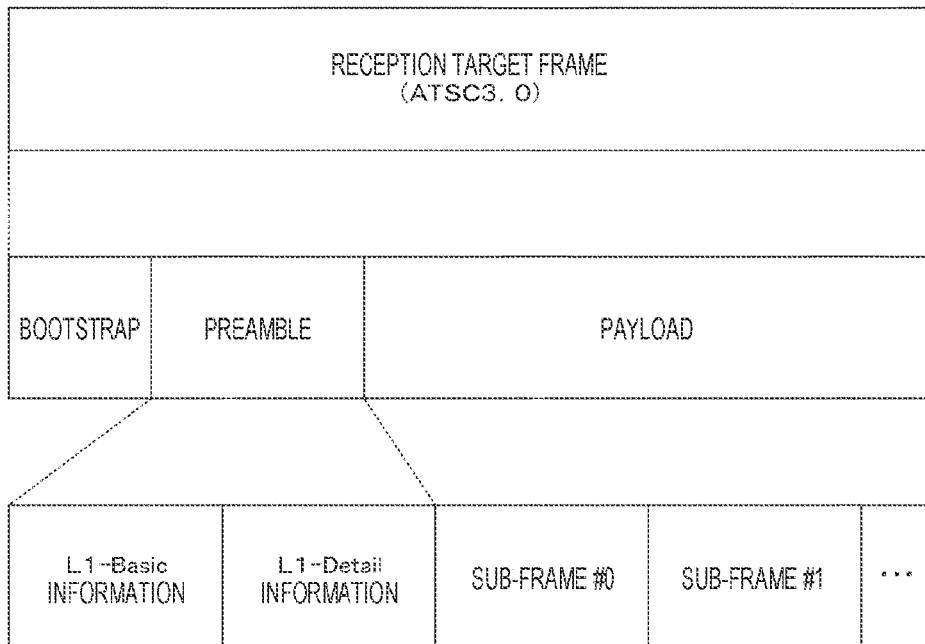
FIG. 7 is a diagram illustrating an example of a data structure of a reception target frame in the embodiment of the present technology.
FIGS. 8A and 8B are diagrams illustrating an example of information in a bootstrap in the embodiment of the present technology.

FIG. 7 is a diagram illustrating an example of the data structure of the reception target frame in the embodiment of the present technology. The reception target frame includes the bootstrap, the preamble, and the payload. In the ATSC 3.0 standard, the preamble stores the L1 information including L1-Basic information and L1-Detail information. Furthermore, the payload stores a predetermined number of subframes.

FIGS. 8A and 8B are diagrams illustrating an example of information in the bootstrap in the embodiment of the present technology. In FIGS. 8A and 8B, FIG. 8A illustrates the syntax of a symbol in the bootstrap. In FIGS. 8A and 8B, FIG. 8B illustrates an approximate value of "Elementary Period" for each "bsr_coefficient". Here, "bsr_coefficient" is a coefficient defined by the syntax in the bootstrap. Furthermore, "Elementary Period" is a cycle used in obtaining values of parameters related to various times in units of microseconds, and the values of these parameters are expressed by multiples of "Elementary Period".

As illustrated in FIG. 8A, "bsr_coefficient" is described in the symbol. Furthermore, from "bsr_coefficient", "Elementary Period" is calculated by the following equation.

$$\text{Elementary Period} = 1/\{0.384 \times (16 + \text{bsr\_coefficient})\} \quad \text{Equation 1}$$

In the above equation, a unit of "Elementary Period" is a microsecond.

In FIGS. 8A and 8B, FIG. 8B illustrates approximate values of values calculated by Equation 1. For example, in a case where "bsr_coefficient" is "2", "Elementary Period" is about "0.1447" from Equation 1.

FIG. 9 is a diagram illustrating an example of the syntax of the L1-Basic information in the embodiment of the present technology. An "L1B_num_subframes" field is provided in a part 511 surrounded by a broken line in the L1-Basic information. This field is set to the number smaller by one than the number of subframes present in a current frame. For example, in a case where the number of subframes is S (S is an integer)+1, the field is set to a value of S.

Furthermore, an "L1B_preamble_num_symbols" field is provided in a part 512. This field is set to the number smaller by one than the total number of preamble orthogonal frequency division multiplexing (OFDM) symbols.

Furthermore, an "L1B_first_sub_fft_size" field is provided in a part 513. This field indicates an FFT size associated with a first subframe of the current frame.

Furthermore, an "L1B_first_sub_guard_interval" field is provided in a part 514. This field indicates a guard interval length used for OFDM symbols in the first subframe of the current frame.

Furthermore, an "L1B_first_sub_num_ofdm_symbols" field is provided in a part 515. This field is set to the number smaller by one than the total number of data payload OFDM symbols present in the first subframe of the current frame.

FIG. 10 is a diagram illustrating an example of the syntax of the L1-Detail information in the embodiment of the present technology. An "L1D_fft_size" field is provided in a part 521. This field indicates an FFT size associated with an i-th (i is an integer from one to L1B_num_subframes) subframe following the first (in other words, the 0th) subframe.

Furthermore, an "L1D_guard_interval" field is provided in a part 522. This field indicates a guard interval length used for OFDM symbols in the i-th subframe.

Furthermore, an "L1D_num_ofdm_symbols" field is provided in a part 523. This field is set to the number smaller by one than the total number of data OFDM symbols present in the i-th subframe.

FIGS. 11A and 11B are diagrams illustrating an example of the FFT size and the guard interval length in the embodiment of the present technology. In FIGS. 11A and 11B, FIG. 11A is an example of the FFT size corresponding to a value in the L1 information, and FIG. 11B is an example of the guard interval length corresponding to a value in the L1 information.

As illustrated in a in FIGS. 11A and 11B, the values set in "L1D_fft_size" and "L1B_first_sub_fft_size" indicate the FFT size. For example, a value of "00" indicates an FFT size of "8K".

Furthermore, as illustrated in FIG. 11B, the values set in "L1D_guard_interval" and "L1B_first_sub_guard_interval" indicate the guard interval length. For example, a value of "0001" indicates a guard interval length of "192".

The syntax and the like of FIGS. 8A, 8B, 9, 10, 11A, and 11B are described in "ATSC Standard: Physical Layer Protocol Doc. A/322: 2017", Advanced Television Systems Committee, Internet (https://www.atsc.org/standards/atsc-3-0-standards/)".

Here, the reception target frame length is expressed by the following equation.

[Math. 1]

$$\text{ATSC3.0\_Len} = \text{bs\_len} + \text{pb\_len} + \text{sub0\_len} + \sum_{i=1}^{s} \text{sub}[i]\_\text{len} \times \text{Elementary\_period} \quad \text{Equation 2}$$

In the above equation, "ATSC3.0_len" indicates the reception target frame length, and a unit of "ATSC3.0_len" is a microsecond (μs). "bs_len" indicates the length of the bootstrap in the reception target frame, and has a fixed value of "12288". "pb_len" indicates the length of the preamble in the reception target frame. "sub0_len" indicates the length of the first (in other words, the 0th) subframe in the reception target frame. "sub[i]_len" indicates the length of the i-th subframe in the reception target frame. S indicates the value of "L1B_num_subframes".

"pb_len" in Equation 2 is expressed by the following equation.

$$\text{pb\_len} = \text{fft\_point}b \times (L1B\_\text{preamble\_num\_symbols} + 1) \quad \text{Equation 3}$$

$$\text{fft\_point}b = L1B\_\text{first\_sub\_fft\_size} + L1B\_\text{first\_sub\_guard\_interval} \quad \text{Equation 4}$$

Furthermore, "sub0_len" in Equation 2 is expressed by the following equation.

$$\text{sub0\_len} = \text{fft\_point}b \times (L1B\_\text{first\_sub\_num\_ofdm\_symbols} + 1) \quad \text{Equation 5}$$

Furthermore, "sub[i]_len" in Equation 2 is expressed by the following equation.

$$\text{sub}[i]\_\text{len} = \text{fft\_point}d \times (L1D\_\text{num\_ofdm\_symbols} + 1) \quad \text{Equation 6}$$

$$\text{fft\_point}d = L1D\_\text{fft\_size} + L1D\_\text{guard\_interval} \quad \text{Equation 7}$$

The reception target frame length calculation unit 141 analyzes the bootstrap and the L1 information, and acquires the information illustrated in FIGS. 8A, 8B, 9, 10, 11A, and 11B. Specifically, as described above, "bsr_coefficient", the number of subframes, the FFT size, the number of symbols, and the guard interval length are acquired. The reception target frame length calculation unit 141 then calculates the reception target frame length by substituting the values of the information into Equations 2 to 7.

[Configuration Example of Reception Control Unit]

Figure 12:
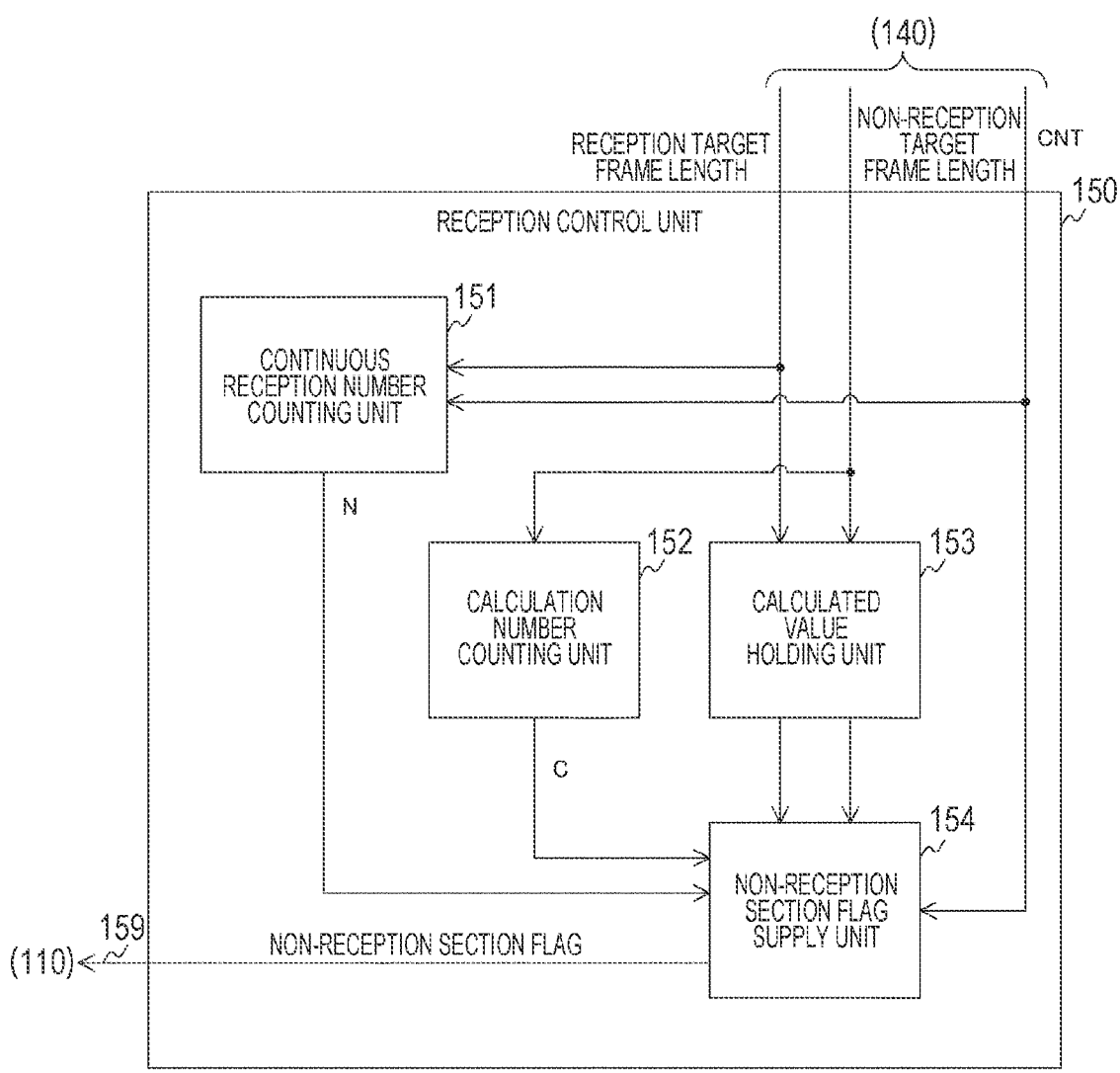
FIG. 12 is a block diagram illustrating a configuration example of a reception control unit in the embodiment of the present technology.

FIG. 12 is a block diagram illustrating a configuration example of the reception control unit 150 in the embodiment of the present technology. The reception control unit 150 includes a continuous reception number counting unit 151, a calculation number counting unit 152, a calculated value holding unit 153, and a non-reception section flag supply unit 154.

The continuous reception number counting unit 151 counts the number of times of continuously receiving the reception target frame without inserting the non-reception target frame. The continuous reception number counting unit 151 monitors the elapsed time CNT and compares the maximum value of the elapsed time CNT with the reception target frame length. When the maximum value of the elapsed time CNT (that is, the reception interval) substantially matches the reception target frame length, the continuous reception number counting unit 151 determines that reception target frames have been continuously received and counts up a count value. In addition, when the reception interval does not substantially match the reception target frame length, the continuous reception number counting unit 151 supplies, to the non-reception section flag supply unit 154, the count value at this time as a measured value N of a continuous reception number.

The calculation number counting unit 152 counts the number of times of calculating the non-reception target frame length. The calculation number counting unit 152 supplies a count value as a calculation number C (C is an integer) to the non-reception section flag supply unit 154.

The calculated value holding unit 153 holds respective values of the calculated reception target frame length and non-reception target frame length.

The non-reception section flag supply unit 154 generates a non-reception section flag indicating a section in which the RF circuit 110 should stop the reception processing, and supplies the non-reception section flag to the RF circuit 110. The non-reception section flag supply unit 154 starts supplying the non-reception section flag in a case where the calculation number C of the calculation number counting unit 152 is larger than a predetermined threshold value Th (Th is an integer).

In addition, when the number of times of continuously receiving the reception target frame reaches the measured value N, the non-reception section flag supply unit 154 supplies, for example, a high-level non-reception section flag for a period of a non-digital frame length from the end of reception of the N-th frame. The RF circuit 110 stops the reception processing for the period in which the non-reception section flag is at the high level. For example, the RF circuit 110 stops the reception processing by stopping the clock signal to the analog RF circuit 111 and the analog-to-digital converter 112 or shutting off the power supply.

For example, when the receiver 100 continuously receives five reception target frames and then receives a non-reception target frame, the continuous reception number counting unit 151 supplies "5" as a measured value. When the transmission of the five reception target frames and the non-reception target frame is repeated four times, the calculation number counting unit 152 supplies "4" as the calculation number C. In a case where the calculation number C is larger than the threshold value Th, the non-reception section flag supply unit 154 supplies, every time five reception target frames are continuously received thereafter, the high-level non-reception section flag for the period of the non-digital frame length from the end of reception of a last frame.

Figure 13:
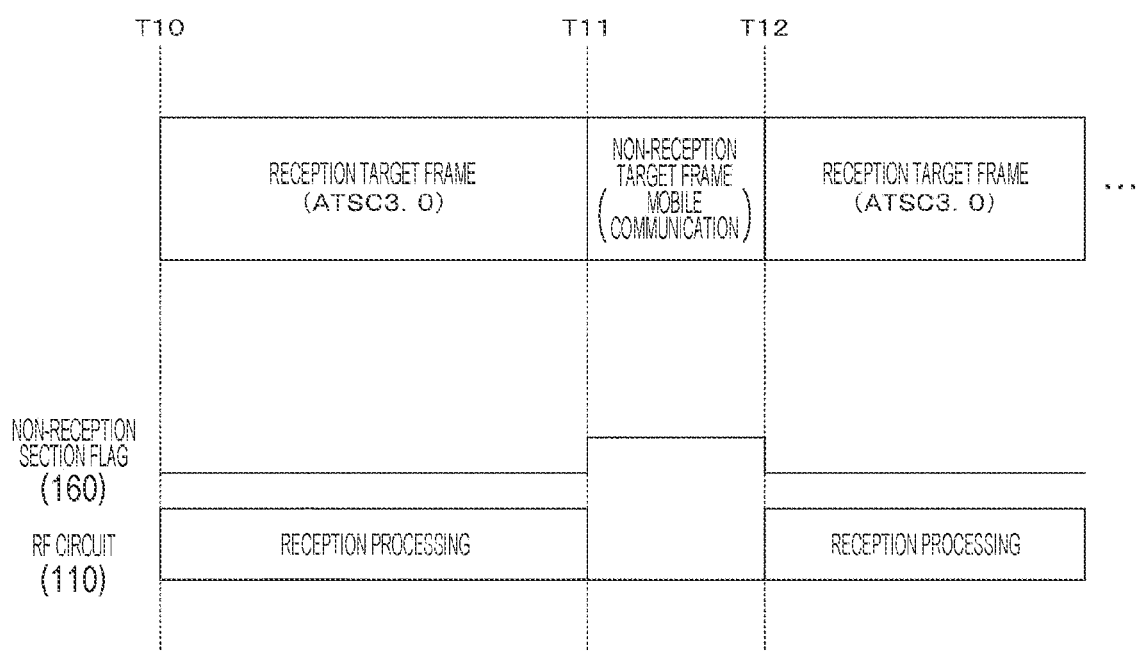
FIG. 13 is a timing chart illustrating an example of an operation of the receiver in the embodiment of the present technology.

FIG. 13 is a timing chart illustrating an example of an operation of the receiver 100 in the embodiment of the present technology. The reception start timing of the N-th reception target frame among the N consecutive reception target frames is T10, and the reception end timing of the N-th reception target frame is T11.

In a case where the calculation number is larger than the threshold value Th, the non-reception section flag supply unit 154 sets the non-reception section flag to the high level from the reception end timing T11 of the N-th reception target frame to a timing T12 at which the period of the non-reception target frame length elapses. The RF circuit 110 performs the reception processing on the reception target frame during a period in which the non-reception section flag is at a low level. On the other hand, the RF circuit 110 stops the reception processing on frames during a period in which the non-reception section flag is at the high level. This period is a period in which the non-reception target frame is transmitted. As a result, even in a case where a signal that does not correspond to the ATSC 3.0 standard is subjected to time division multiplexing into the terrestrial digital broadcasting signal of the ATSC 3.0 standard, the receiver 100 can appropriately receive the terrestrial digital broadcasting.

Figure 14:
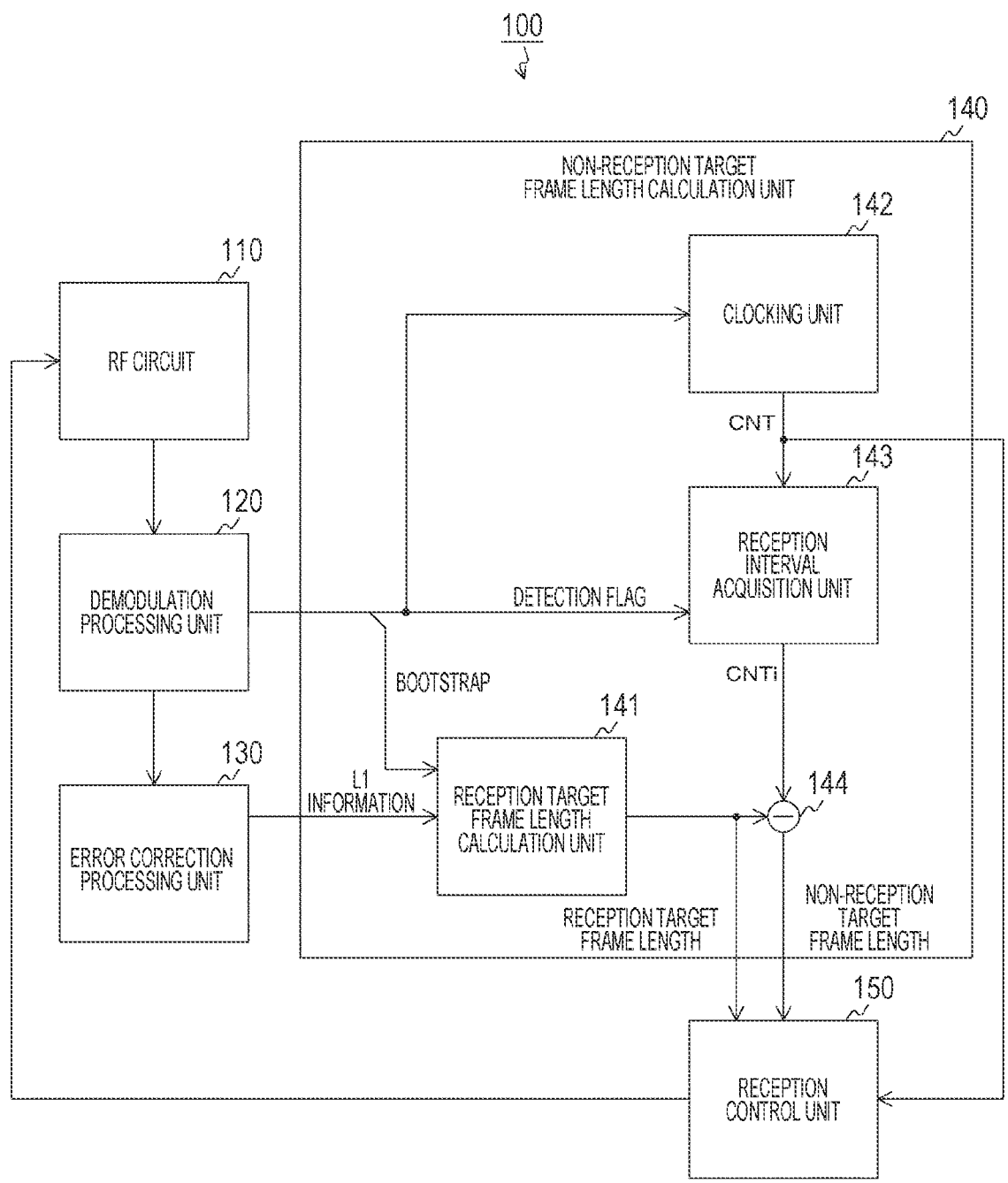
FIG. 14 is an example of an overall view of the receiver in the embodiment of the present technology.

FIG. 14 is an example of an overall view of the receiver 100 in the embodiment of the present technology. The RF circuit 110 receives the RF signal including the predetermined number of reception target frames.

The demodulation processing unit 120 demodulates the RF signal to generate the demodulated signal, and detects the reception end timing of the bootstrap in the reception target frame of the ATSC 3.0 standard. The error correction processing unit 130 corrects an error in the demodulated signal and acquires the L1 information in the reception target frame.

The clocking unit 142 clocks the elapsed time CNT that has elapsed from the reception end timing of the bootstrap. The reception interval acquisition unit 143 acquires the maximum value of the elapsed time CNT as the interval between the reception start timings of the reception target frames (that is, the reception interval CNTi).

The reception target frame length calculation unit 141 calculates the reception target frame length on the basis of the bootstrap and the L1 information.

The subtractor 144 obtains the difference between the reception interval CNTi and the reception target frame length as the non-reception target frame length.

The reception control unit 150 stops the reception processing of the RF circuit 110 for the period of the difference (that is, the non-reception target frame length). As a result, the receiver 100 can receive only the reception target frame of the ATSC 3.0 standard.

[Operation Example of Receiver]

Figure 15:
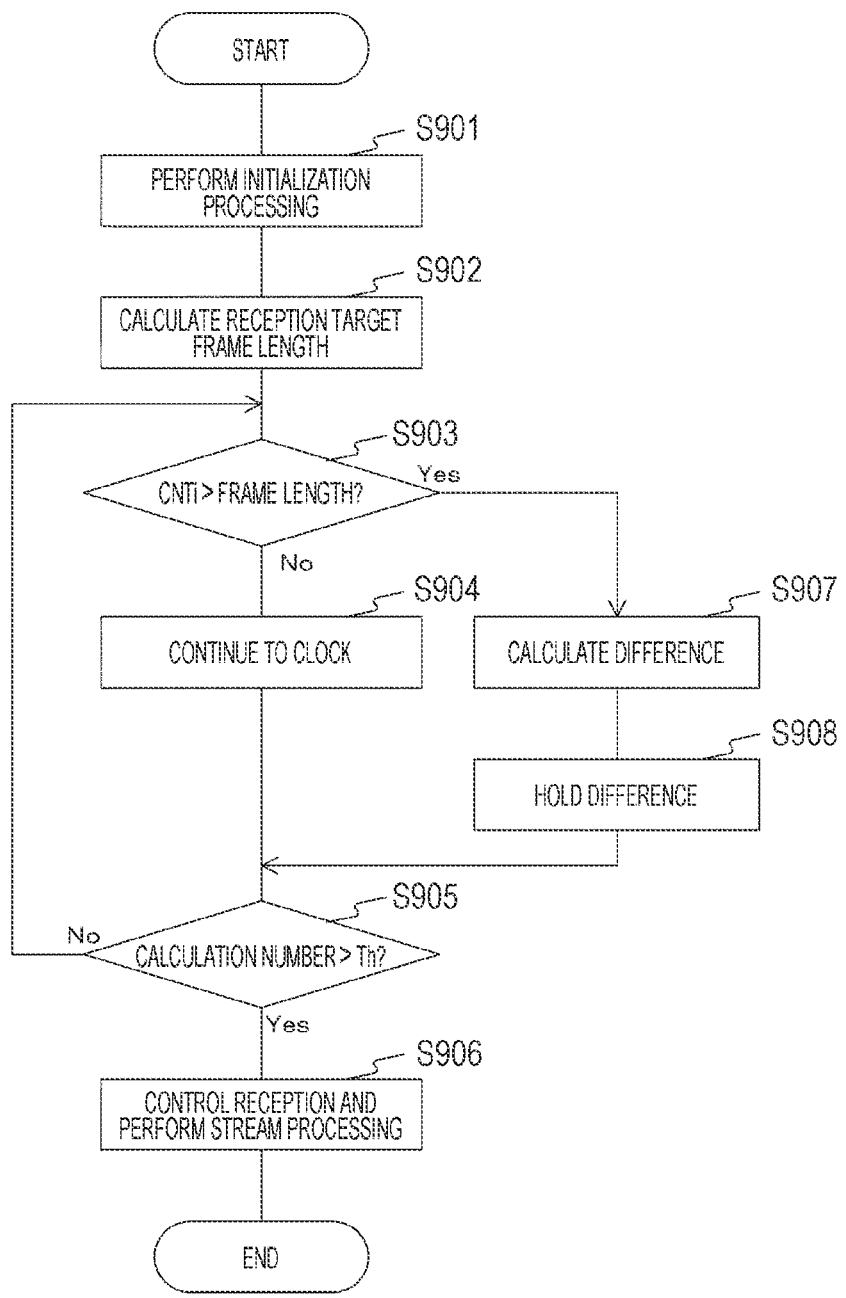
FIG. 15 is a flowchart illustrating an example of the operation of the receiver in the embodiment of the present technology.

FIG. 15 is a flowchart illustrating an example of the operation of the receiver 100 in the embodiment of the present technology. This operation is started, for example, when a predetermined application for receiving the terrestrial digital broadcasting is executed.

The receiver 100 performs predetermined initialization processing (step S901). In this initialization processing, for example, the receiver 100 initializes the parameters of the calculation number C of the non-reception target frame length and the elapsed time CNT. Furthermore, the reception control unit 150 in the receiver 100 stops the supply of the non-reception section flag, and the stream processing unit 134 stops the output of the TS packets.

The receiver 100 then receives the RF signal and calculates the frame length of the terrestrial reception target frame on the basis of the L1 information and the like (step S902). The receiver 100 determines whether or not the reception interval CNTi is longer than the calculated frame length (step S903).

In a case where the reception interval CNTi is equal to or less than the frame length (step S903: No), the clocking unit 142 continues to clock the elapsed time CNT from the reception end timing of the bootstrap (step S904).

On the other hand, in a case where the reception interval CNTi is longer than the frame length (step S903: Yes), the subtractor 144 calculates the difference therebetween (step S907), and the reception control unit 150 holds the value of the difference as the non-reception target frame length (step S908).

After step S904 or S908, the receiver 100 determines whether or not the calculation number C of the non-digital frame length is larger than the predetermined threshold value Th (step S905).

In a case where the calculation number C is equal to or less than the threshold value Th (step S905: No), the receiver 100 repeatedly executes steps S903 and subsequent steps. On the other hand, in a case where the calculation number C is larger than the threshold value Th (step S905: Yes), the reception control unit 150 performs control to stop the reception processing for the period of the non-reception target frame length. Furthermore, the stream processing unit 134 performs stream processing during a period other than the period of the non-reception target frame length (step S906). After step S906, the receiver 100 terminates the reception operation.

As described above, according to the first embodiment of the present technology, the receiver 100 stops the reception processing of the RF circuit 110 for the period of the difference between the reception target frame length and the reception interval, and thus can stop the reception processing on signals of mobile communication or the like within the period of the difference. As a result, even in a case where the terrestrial digital broadcasting signal of the ATSC 3.0 standard and other signals are subjected to time division multiplexing and transmitted, the receiver 100 can appropriately receive only the signal of the ATSC 3.0 standard.

2. First Modification

In the above-described embodiment, the receiver 100 stops only the reception processing of the RF circuit 110 within the period of the non-reception section flag. However, from a viewpoint of reducing power consumption, it is desirable to stop, together with the RF circuit 110, the processing of the demodulation processing unit 120 and the error correction processing unit 130 as well. The receiver 100 of a first modification of this embodiment is different from that of the embodiment in that the processing of the demodulation processing unit 120 and the error correction processing unit 130 is further stopped within the period of the non-reception section flag.

Figure 16:
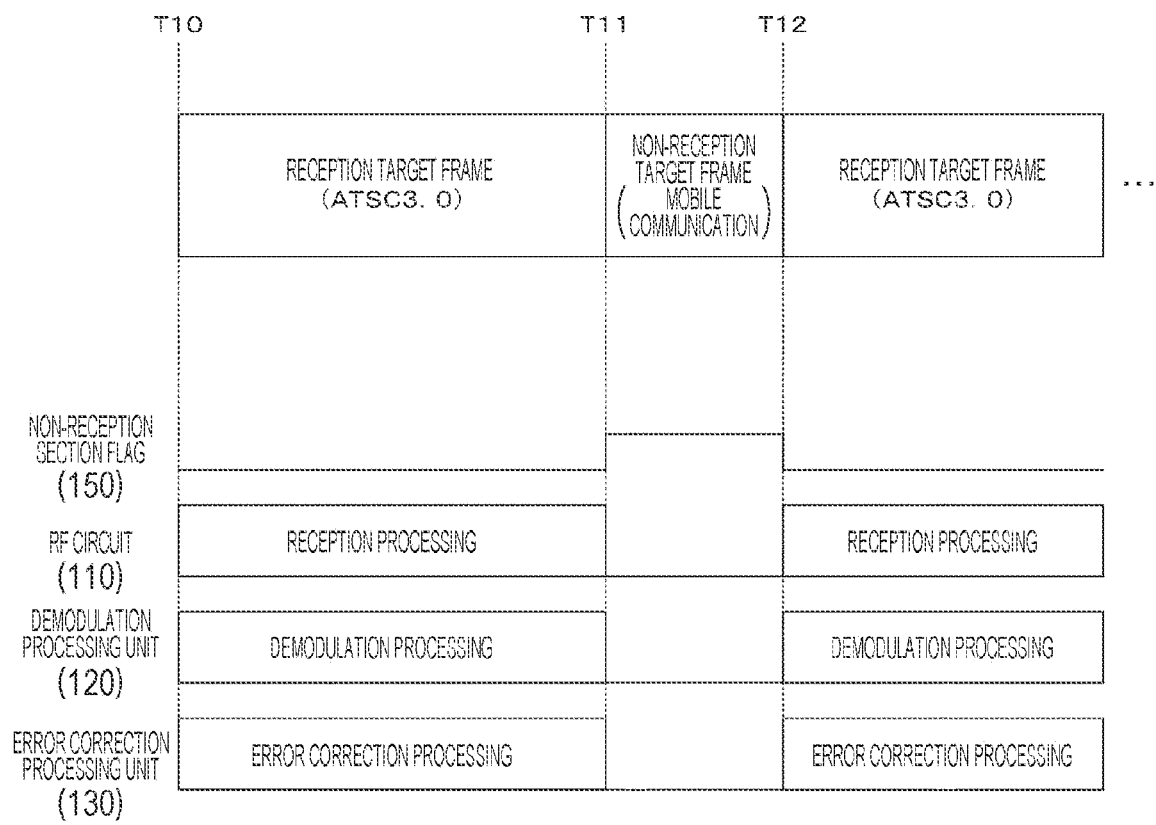
FIG. 16 is a timing chart illustrating an example of the operation of the receiver in a first modification of the embodiment of the present technology.

FIG. 16 is a timing chart illustrating an example of an operation of the receiver in the first modification of the embodiment of the present technology. In this first modification, the reception control unit 150 further supplies the non-reception section flag to the demodulation processing unit 120 and the error correction processing unit 130.

In a case where the calculation number is larger than the threshold value Th, the non-reception section flag supply unit 154 sets the non-reception section flag to the high level from the timing T11 to the timing T12. According to this non-reception section flag, the RF circuit 110 performs the reception processing on the reception target frame during the period in which the flag is at the low level. During the period, the demodulation processing unit 120 and the error correction processing unit 130 perform the demodulation processing and the error correction processing.

On the other hand, the RF circuit 110 stops the reception processing on frames during the period in which the non-reception section flag is at the high level. Furthermore, during the period, the demodulation processing unit 120 and the error correction processing unit 130 also stop the demodulation processing and the error correction processing.

As described above, according to the first modification of the embodiment of the present technology, the reception control unit 150 stops the demodulation processing and the error correction processing as well within the period for stopping the reception processing, and thus the power consumption can be reduced as compared with the case where only the reception processing is stopped.

3. Second Modification

In the above-described embodiment, the receiver 100 calculates and holds only one non-reception target frame length, but in this configuration, in a case where a plurality of versions of non-reception target frames is inserted, it may not be possible to stop receiving all of the non-reception target frames. The receiver 100 of a second modification of this embodiment is different from that of the embodiment in that frame lengths of the plurality of versions of non-reception target frames are calculated and held for each version.

FIG. 17 is a diagram illustrating an example of the calculated value of the frame length for each version in the second modification of the embodiment of the present technology. The plurality of versions of non-reception target frames other than the ATSC 3.0 is transmitted to the receiver 100 of this second modification. For example, a frame of the ATSC 3.1 standard and a frame of the ATSC 3.2 standard are transmitted.

The non-reception target frame length calculation unit 140 of the second modification calculates the frame length of the non-reception target frame of each of the ATSC 3.1 standard and the ATSC 3.2 standard from the difference between the reception target frame length and the reception interval. Furthermore, as illustrated in FIG. 17, the calculated value holding unit 153 holds the frame length for each ATSC version. For example, calculated frame lengths "LEN1", "LEN2", and "LEN3" are held in association with the ATSC 3.0, the ATSC 3.1, and the ATSC 3.2.

The non-reception section flag supply unit 154 then supplies the non-reception section flag for a period of the non-reception target frame length of each of the ATSC 4.0 standard and the ATSC 4.1 standard to stop the reception processing.

Note that, although the receiver 100 calculates the frame length of each of two versions (ATSC 3.1 standard and ATSC 3.2 standard, for example) other than the ATSC 3.0, the present technology is not limited to this configuration. The receiver 100 can also calculate the frame length of each of three or more versions other than the ATSC 3.0.

As described above, according to the second modification of the embodiment of the present technology, the receiver 100 calculates, for each version, the frame lengths of the plurality of versions of non-reception target frames, and thus can stop receiving all the non-reception target frames.

Note that the above-described embodiment shows an example for embodying the present technology, and matters in the embodiment and matters specifying the invention in the claims have a corresponding relationship. Similarly, the matters specifying the invention in the claims and matters in the embodiment of the present technology denoted by the same names as those in the claims have a correspondence relationship. However, the present technology is not limited to the embodiment, and can be embodied by variously modifying the embodiment without departing from the gist thereof.

Furthermore, the processing procedures described in the above-described embodiment may be regarded as a method having a series of these procedures, or may be regarded as a program for causing a computer to execute the series of these procedures or a recording medium storing the program. As the recording medium, for example, a compact disc (CD), a minidisc (MD), a digital versatile disc (DVD), a memory card, a Blu-ray disc (Blu-ray (registered trademark) disc), or the like can be used.

Note that the effects described in the present specification are merely examples and are not limited, and other effects may be obtained.

Note that the present technology may have the following configurations.

(1) A receiver including
    a reception unit that performs reception processing of sequentially receiving a predetermined number of reception target frames, each of which is a transmission unit of a terrestrial digital broadcasting signal, a reception interval acquisition unit that obtains, as a reception interval, an interval between respective reception start timings of the predetermined number of reception target frames, a frame length acquisition unit that acquires a frame length of each of the reception target frames on the basis of the reception target frames, and a reception control unit that stops the reception processing for a period of a length of a difference between the reception interval and the frame length.

(2) The receiver according to (1), further including a clocking unit that performs processing of clocking elapsed time that has elapsed from a reception end timing of a bootstrap in the reception target frame and processing of initializing the elapsed time every time the reception end timing is detected, in which the reception interval acquisition unit acquires a maximum value of the elapsed time as the reception interval.

(3) The receiver according to (2), further including a demodulation processing unit that performs demodulation processing of demodulating the reception target frame to generate a demodulated signal and processing of detecting the reception end timing of the bootstrap.

(4) The receiver according to (3), further including an error correction processing unit that performs error correction processing of correcting an error of the demodulated signal.

(5) The receiver according to (4), in which the reception control unit further stops the demodulation processing and the error correction processing for the period of the length of the difference.

(6) The receiver according to any of (1) to (5), further including a subtractor that acquires the difference and supplies the difference to the reception control unit every time the reception interval and the frame length are acquired, in which the reception control unit stops the reception processing for the period of the length of the difference in a case where the number of times of acquiring the difference is larger than a predetermined threshold value.

(7) The receiver according to any of (1) to (6), in which the terrestrial digital broadcasting signal is a signal conforming to Advanced Television Systems Committee standards (ATSC) standards.

(8) The receiver according to (7), in which the frame length acquisition unit acquires, from the reception target frame, information indicating each of "bsr_coefficient", the number of subframes, an FFT size, the number of symbols, and a guard interval length, and calculates the frame length by using the information.

(9) A control method for a receiver, the control method including a reception step of performing reception processing of sequentially receiving a predetermined number of reception target frames, each of which is a transmission unit of a terrestrial digital broadcasting signal, a reception interval acquisition step of obtaining, as a reception interval, an interval between respective reception start timings of the predetermined number of reception target frames, a frame length acquisition step of acquiring a frame length of each of the reception target frames on the basis of the reception target frames, and a reception control step of stopping the reception processing for a period of a length of a difference between the reception interval and the frame length.

REFERENCE SIGNS LIST

100 Receiver
101 Antenna
110 RF circuit
111 Analog RF circuit
112 Analog-to-digital converter
120 Demodulation processing unit
121 Baseband signal conversion unit
122 Bootstrap detection unit
123 Fast Fourier transform unit
124 Equalization processing unit
130 Error correction processing unit
131 Internal code decoding unit
132 Deinterleaver
133 External code decoding unit
134 Stream processing unit
140 Non-reception target frame length calculation unit
141 Reception target frame length calculation unit
142 Clocking unit
143 Reception interval acquisition unit
144 Subtractor
150 Reception control unit
151 Continuous reception number counting unit
152 Calculation number counting unit
153 Calculated value holding unit
154 Non-reception section flag supply unit

The invention claimed is:

1. A receiver, comprising:

a reception unit configured to perform reception processing of sequentially receiving a predetermined number of reception target frames, each of which is a transmission unit of a terrestrial digital broadcasting signal;

a reception interval acquisition unit configured to obtain, as a reception interval, an interval between respective reception start timings of the predetermined number of reception target frames;

a frame length acquisition unit configured to acquire a frame length of each of the reception target frames based on a basis of the reception target frames; and a reception control unit configured to stop the reception processing for a period of a length of a difference between the reception interval and the frame length.

2. The receiver according to claim 1, further comprising:

a clocking unit is configured to perform processing of clocking elapsed time that has elapsed from a reception end timing of a bootstrap in the reception target frame and processing of initializing the elapsed time every time the reception end timing is detected, wherein the reception interval acquisition unit acquires a maximum value of the elapsed time as the reception interval.

3. The receiver according to claim 2, further comprising:

a demodulation processing unit is configured to perform demodulation processing of demodulating the reception target frame to generate a demodulated signal and processing of detecting the reception end timing of the bootstrap.

4. The receiver according to claim 3, further comprising:

an error correction processing unit is configured to perform error correction processing of correcting an error of the demodulated signal.

5. The receiver according to claim 4, wherein the reception control unit is further configured to stop the demodulation processing and the error correction processing for the period of the length of the difference.

6. The receiver according to claim 1, further comprising:

a subtractor configured to acquire the difference and supply the difference to the reception control unit every time the reception interval and the frame length are acquired, wherein the reception control unit is further configured to stop the reception processing for the period of the length of the difference in a case where the number of times of acquiring the difference is larger than a predetermined threshold value.

7. The receiver according to claim 1, wherein the terrestrial digital broadcasting signal is a signal conforming to Advanced Television Systems Committee standards (ATSC) standards.

8. The receiver according to claim 7, wherein the frame length acquisition unit is further configured to acquire, from the reception target frame, information indicating each of "bsr_coefficient", the number of subframes, an FFT size, the number of symbols, and a guard interval length, and calculate the frame length by using the information.

9. A control method for a receiver, the control method comprising:

a reception step of performing reception processing of sequentially receiving a predetermined number of reception target frames, each of which is a transmission unit of a terrestrial digital broadcasting signal;

a reception interval acquisition step of obtaining, as a reception interval, an interval between respective reception start timings of the predetermined number of reception target frames;

a frame length acquisition step of acquiring a frame length of each of the reception target frames based on the reception target frames; and a reception control step of stopping the reception processing for a period of a length of a difference between the reception interval and the frame length.

* * * * *